March 4, 1952   P. J. McCULLOUGH   2,587,747
PRESSURE CHAMBER LIQUID CONTROL UNIT
Filed Jan. 8, 1949   2 SHEETS—SHEET 1

INVENTOR
Paul J. McCullough
By Rodney Bedell
ATTY.

March 4, 1952 P. J. McCULLOUGH 2,587,747
PRESSURE CHAMBER LIQUID CONTROL UNIT
Filed Jan. 8, 1949 2 SHEETS—SHEET 2

INVENTOR
Paul J. McCullough
BY Rodney Bedell
ATTY.

Patented Mar. 4, 1952

2,587,747

UNITED STATES PATENT OFFICE 2,587,747

PRESSURE CHAMBER LIQUID CONTROL UNIT

Paul J. McCullough, St. Louis, Mo., assignor to Joseph Pavelka, St. Louis, Mo.

Application January 8, 1949, Serial No. 69,898

2 Claims. (Cl. 200—84)

The invention relates to control units particularly adapted for actuating a device, such as a pump or valve, to maintain a pre-determined liquid level in a pressure chamber, such as a steam boiler.

Control units used heretofore usually include a switch positioned outside of the boiler and actuated by a float within the boiler when the water level rises or falls. In one type of control unit, the float swings on a shaft journalled in the unit housing and extending from within the unit housing through a stuffing box to the exterior of the unit housing. A crank on the shaft actuates a switch. The stuffing box eventually leaks and the corrosive effect of the water and steam causes the shaft to bind in its bearings, so that the weight of the float when the water recedes and the pressure exerted on the float by the water as it rises is insufficient to rotate the shaft in its bearings and actuate the switch.

One object of the present invention is to effectively seal and to simplify a control unit of the kind generally described.

Another object is to avoid reliance, in such a device, upon relative rotation of a shaft journal and bearing assembly. Another object is to rigidly connect associated parts of the control, yet provide for swinging or tilting movement of the float shaft and the switch actuator.

Another object is to provide an effective seal between relatively movable parts which automatically adjusts itself to accommodate wear.

Other objects will be apparent to those skilled in the art from the following description and accompanying drawings, in which.

Figure 1:
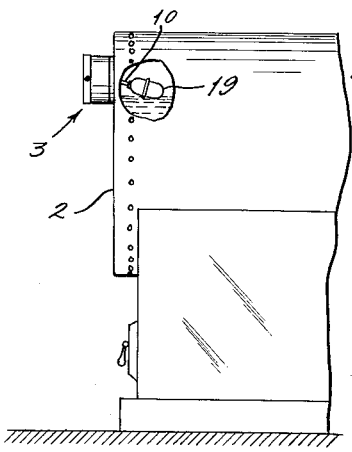
Figure 1 is a side view of a portion of a boiler provided with a control unit constructed according to the invention, the boiler being cut away adjacent the unit to show the float for actuating the control switch.
Figure 2:
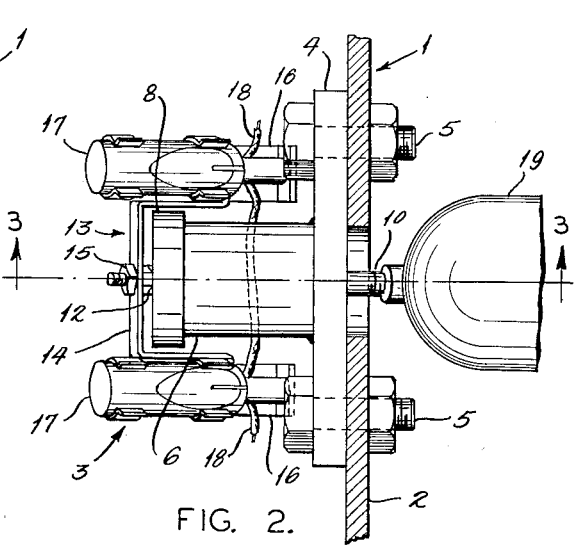
Figure 2 is drawn to enlarged scale and shows a top view of the control unit with the cover removed and shows the associated boiler wall sectioned horizontally.
Figure 3:
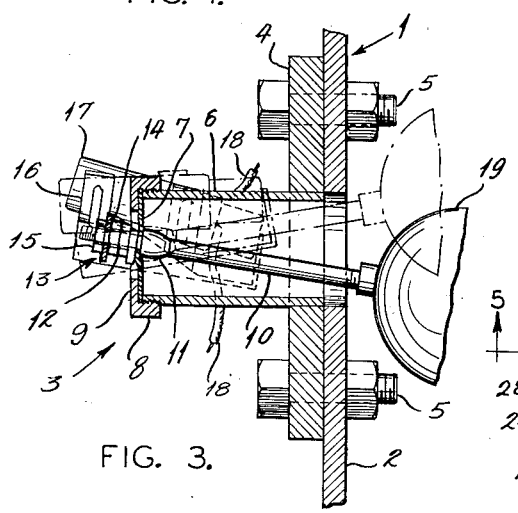
Figure 3 is a vertical longitudinal section taken approximately on the line 3—3 of Figure 2 and showing the float and switch assembly in circuit opening position in dot-dash lines and showing the float and switch assembly in circuit closing position in solid lines.
Figure 4:
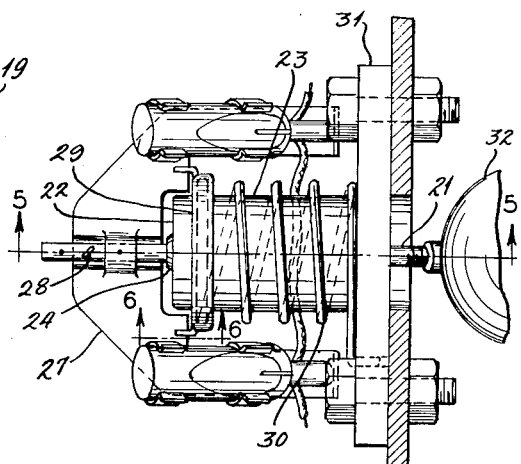
Figure 5:
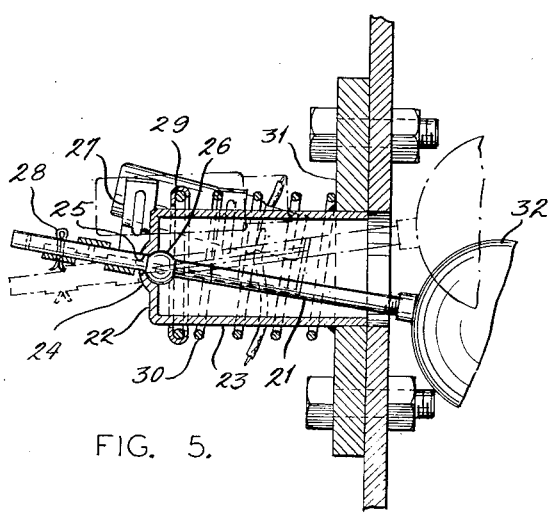

Figures 4 and 5 are views similar to Figures 2 and 3, respectively, and show another form of the invention, Figure 5 being a vertical section approximately on the line 5—5 of Figure 4.

Figure 6:
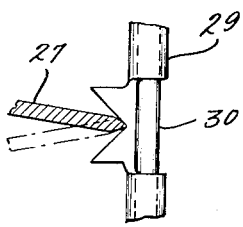

Figure 6 is a detail vertical section drawn to enlarged scale and taken approximately on the line 6—6 of Figure 4.

Figure 7:
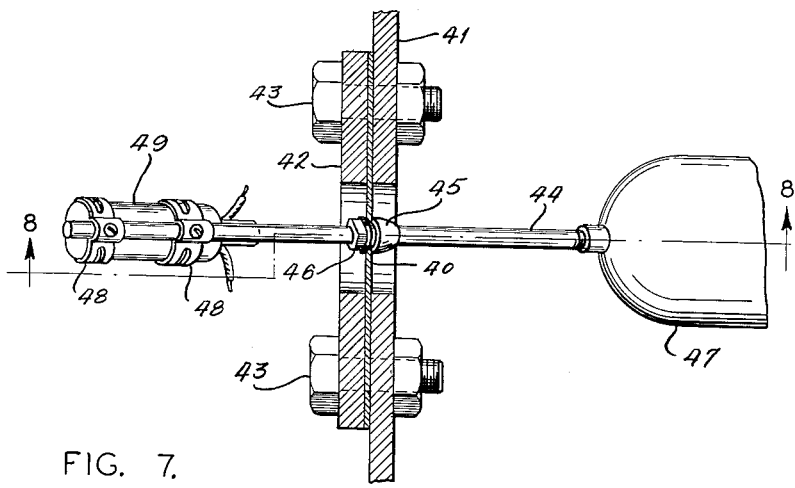
Figure 8:
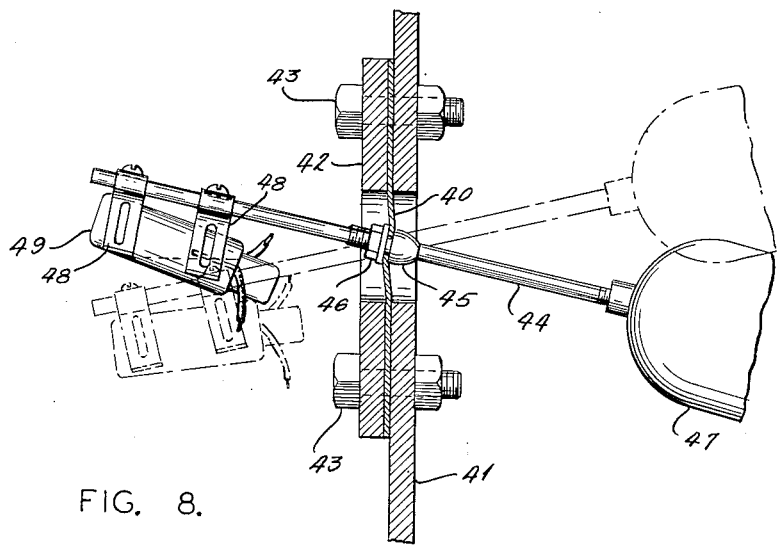

Figures 7 and 8 are views similar to Figures 2 and 3, respectively, and show another form of the invention, Figure 8 being a vertical section approximately on the line 8—8 of Figure 7.

A boiler 1 includes a side wall 2 mounting a control unit 3 constructed according to the invention for actuating a pump or valve to maintain a pre-determined water level in the boiler.

The control unit shown in Figures 2 and 3 includes a body having a face plate 4 secured by bolts 5 to wall 2. A cylindrical member 6 is rigid with face plate 4 and extends outwardly of the boiler. A flexible sheet or diaphragm 7 of beryllium or other suitable material closes the outer end of member 6 and is held in place by a cap 8 threaded to the outer end of member 6 and having a washer-like portion 9 overlying the sheet.

A rod 10 extends through sheet 7 and from each end of member 6. Sheet 7 is clamped between an enlargement 11, integral with the rod, and a nut 12, threaded on the rod.

A substantially U-shaped switch carrier 13 is secured at its base 14 by a nut 15 to the outer end of rod 10, and with a leg 16 extending at each side of member 6. A mercury or other suitable switch 17 is mounted on each of legs 16 and the switches are connected by wires 18 in series with the device (not shown) for causing water flow to the boiler.

A float 19 is mounted on the inner end of rod 10 within boiler 1. When the water recedes, float 19, rod 10 and switch carrier 13 tilt or pivot or swing to the position shown in solid lines in Figure 3 to actuate the device for causing water flow to the boiler. When the water rises float 19, rod 10 and switch carrier 13 tilt or pivot or swing to the position shown in dot-dash lines in Figure 3 to stop the flow of water to the boiler.

All associated parts of the unit are connected rigidly. The flexibility of sheet 7 provides for pivotal movement of rod 10 between the positions indicated in Figure 3 to actuate switches 17. Sheet 7, although relatively thin, easily withstands operating pressures within boiler 1 because a large area of the sheet is reenforced by overlying portions 9 of cap 8.

The control unit shown in Figures 4-6 is substantially the same as the unit shown in Figures 2 and 3 except for the float rod pivot and its associated seal. In the arrangement shown in Figures 4 to 6, a rigid outer cap 22 on cylindrical member 23 has a central socket-like element 24 apertured at 25 to receive rod 21. A ball 26 on rod 21 is seated in socket 24. A U-shaped switch carrier 27 is secured by a pin 28 to the outer end of rod 21 and the inner edge of its base engages a ring-like part 29 slidable on member 23. A spring 30 encircles member 23 and is seated at its inner end on face plate 31 and at its outer end on ring-like part 29. Spring 30 urges part 29, switch carrier 27, and rod 21 outwardly so that ball 26 is seated firmly in socket 25.

When float 32, rod 21, and carrier 26 tilt between the positions shown in solid lines and in dot-dash lines in Figure 5, ball 26 swivels in socket 25. With this arrangement, the ball and socket provide an effective seal which automatically adjusts itself, through spring 30, to accommodate wear.

The control unit shown in Figures 7 and 8 has a flexible sheet 40 secured directly between the boiler wall 41 and face plate 42 by bolts 43. A rod 44 extends through sheet 40 and the sheet is clamped between an enlargement 45 and a nut 46. A float 47 is mounted on one end of rod 44 within the boiler and a switch carrier 48 is secured to the other end of rod 44 exteriorly of the boiler. A single mercury switch 49 is mounted on switch carrier 48.

The three arrangements described effectively seal the unit against leaks. Rod 21 will not bind and the unit become inoperative, due to the corrosive effect of the steam and water within the boiler as is characteristic of shaft and journal bearing units in general use. The constructions are simple as compared to the devices used heretofore.

It will be understood that snap switches or other types of switches may be substituted for the mercury switches illustrated and that a single switch or switch part may be mounted on the rod if the safety feature of the double switch is not required or the rod may actuate directly a valve or other device for controlling water flow.

The details of the construction may be varied substantially without departing from the spirit of the invention, and the exclusive use of those modifications coming within the scope of the claims is contemplated.

What is claimed is:

1. In an electrical control unit for actuating a device to maintain a pre-determined liquid level in a pressure chamber, a body having a face plate adapted to be secured to a wall of the chamber, a hollow elongated member secured to said face plate and extending outwardly therefrom, a rod extending through said face plate and from each end of said member, a substantially U-shaped switch carrier secured by its base to said rod and with its legs extending at the sides of said member, a mercury switch mounted on each of the carrier legs, there being a pressure seal between said rod and the outer end of said member providing for tilting movement of said rod and carrier for actuating said switches.

2. In an electrical control unit for actuating a device to maintain a pre-determined liquid level in a pressure chamber, a hollow elongated member adapted to be secured to the outer face of a wall of the chamber, a rod extending through said wall and the opposite end of said body, a substantially U-shaped switch carrier with its cross bar secured to the end of said rod projecting from said body and with its legs extending alongside of said body, a mercury switch mounted on each of the legs of said carrier, and a pressure seal between said rod and the outer end of said body comprising an inwardly facing socket on said body and an outwardly facing ball element on said rod and a spring thrusting the cross bar of said carrier away from said body to hold said ball tightly in said socket.

PAUL J. McCULLOUGH.

REFERENCES CITED

The following references are of record in the file of this patent:

UNITED STATES PATENTS

| Number | Name | Date |
|---|---|---|
| Re. 20,380 | Hickstein et al. | May 25, 1937 |
| 1,917,742 | Tinsley | July 11, 1933 |
| 1,997,121 | Rottmann | Apr. 9, 1935 |
| 2,137,880 | Loesser | Nov. 22, 1938 |
| 2,145,199 | Kronmiller | Jan. 24, 1939 |
| 2,400,849 | Stearns | May 21, 1946 |